March 28, 1967  H. KEHL  3,311,094
ROTARY ENGINE
Filed Aug. 18, 1964  4 Sheets-Sheet 1

INVENTOR.
HENRY KEHL
BY *Whittemore,*
*Hulbert & Belknap*
ATTORNEYS

March 28, 1967 H. KEHL 3,311,094
ROTARY ENGINE

Filed Aug. 18, 1964 4 Sheets-Sheet 2

INVENTOR.
HENRY KEHL
BY Whittemore,
Hulbert & Belknap
ATTORNEYS

March 28, 1967  H. KEHL  3,311,094
ROTARY ENGINE
Filed Aug. 18, 1964  4 Sheets-Sheet 3
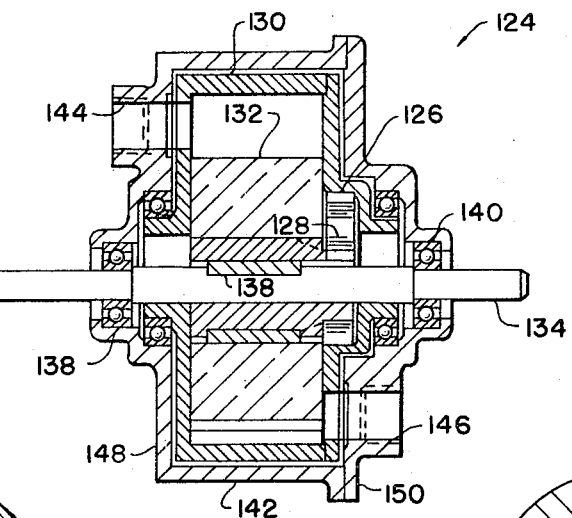
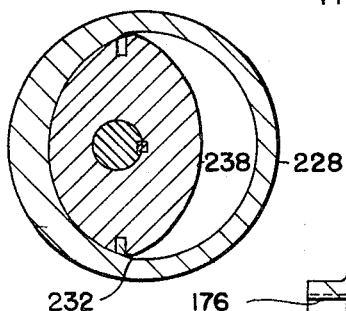
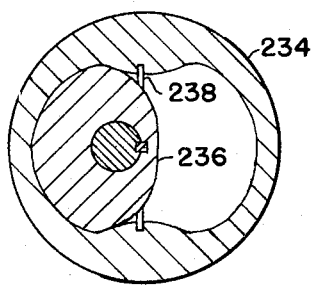
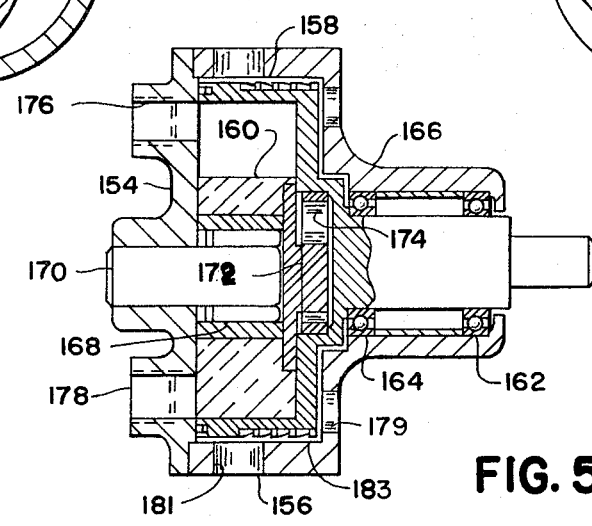
INVENTOR.
HENRY KEHL
BY Whittemore,
Hulbert & Belknap
ATTORNEYS March 28, 1967          H. KEHL          3,311,094

ROTARY ENGINE

Filed Aug. 18, 1964          4 Sheets-Sheet 4

INVENTOR.
HENRY KEHL
BY *Whittemore,*
*Hulbert & Belknap*
ATTORNEYS

United States Patent Office 3,311,094
Patented Mar. 28, 1967

3,311,094
ROTARY ENGINE
Henry Kehl, 3283 Byng Road, Windsor,
Ontario, Canada
Filed Aug. 18, 1964, Ser. No. 390,385
7 Claims. (Cl. 123—12)

The invention relates to rotary structures and refers more specifically to a pair of relatively rotatable rotors, one of which is positioned within the other, which are rotatable about transversely spaced apart axes for use as an internal combustion engine, pump, blower, compressor or the like.

The advantages of rotary structures in, for example, internal combustion engines are well known. For example, with such structures it is not necessary to transfer linear motion into rotary motion with consequent loss of efficiency. Initial rotary motion prevents excessive friction and wear of parts involved in changing of direction of motion.

Prior rotary structures have however been deficient in that in use as internal combustion engines particularly, they have required the eccentric rotation of rotors so that again the rotary structure must provide for the changing of direction of a large moving mass which creates excessive friction, wear and vibration.

Further, rotary engines have often been extremely complicated and therefore unreliable, have presented particular sealing and valving problems and have been inefficient in fuel consumption. Consequently rotary structures have not been used extensively particularly for internal combustion engines.

It is therefore an object of the present invention to provide improved rotary structure for use as an internal combustion engine, pump, blower, compressor or the like.

Another object is to provide a rotary engine wherein all rotating parts are balanced about their axis of rotation.

Another object is to provide rotary engine structure wherein an intake, firing and exhaust portion of separate cycles of operation occur simultaneously.

Another object is to provide rotary engine structure wherein maximum utilization of fuel is possible.

Another object is to provide rotary engine structure including improved sealing means.

Another object is to provide rotary engine structure including improved valving or porting means.

Another object is to provide rotary internal combustion engine structure including an inner rotor having lobes therein and an outer rotor having cavities therein with the inner rotor being rotated inside of the outer rotor on an axis transversely spaced from the axis of rotation of the outer rotor to form chambers between the rotors in conjunction with the lobes and cavities, means for providing predetermined relative speeds of rotation of the rotors and intake, exhaust and firing structures in communication with the chambers formed between the rotors on rotation thereof.

Another object is to provide rotary engine structure as set forth above wherein the outer rotor is rotated faster than the inner rotor.

Another object is to provide rotary engine structure as set forth above wherein the inner rotor is rotated faster than the outer rotor.

Another object is to provide rotary engine structure as set forth above wherein the outer rotor includes one more cavity than the inner rotor has lobes.

Another object is to provide rotary engine structure as set forth above wherein the outer rotor has one less cavity than the inner rotor has lobes.

Another object is to provide rotary structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 4 is a longitudinal section view of a modification of the rotary internal combustion engine structure illustrated in FIGURE 1.

FIGURE 5 is a longitudinal section view of another modification of the rotary internal combustion engine structure illustrated in FIGURE 1.

FIGURES 8A and 8B illustrate other possible rotor forms with different rotor speed ratios.

With particular reference to the figures of the drawings, one embodiment of the present invention will now be considered in detail.

Figure 1:
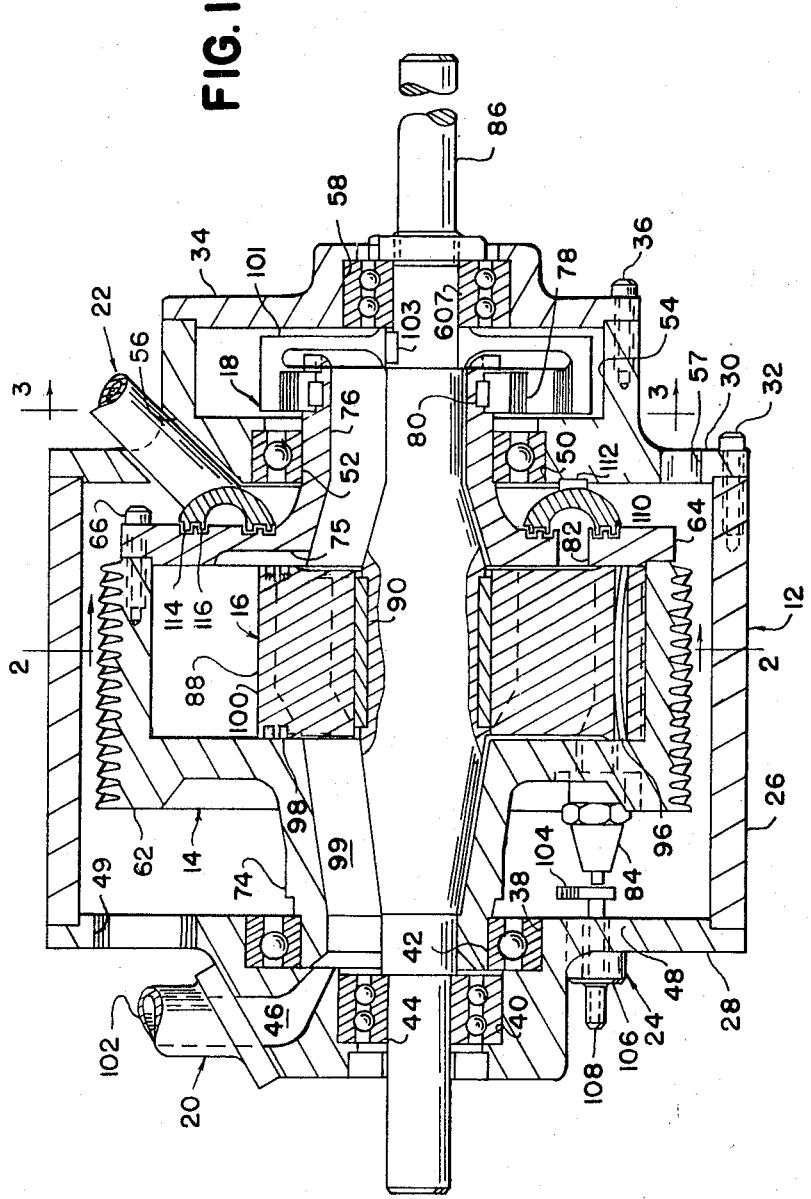
FIGURE 1 is a longitudinal section view of rotary internal combustion engine structure constructed in accordance with the invention.

The rotary internal combustion engine 10 illustrated in FIGURE 1 includes the housing 12, outer rotor 14, inner rotor 16 and rotor speed ratio gear structure 18. In addition, the rotary engine 10 includes the fuel intake structure 20, exhaust structure 22 and ignition structure 24.

In operation, the outer and inner rotors 14 and 16 rotate in housing 12 within each other to provide chambers therebetween into which fuel from the feul intake structure 20 is taken, and in which the fuel is compressed and subsequently ignited by ignition structure 24 and from which the combustion gases are then exhausted through exhaust structure 22.

Figure 2:
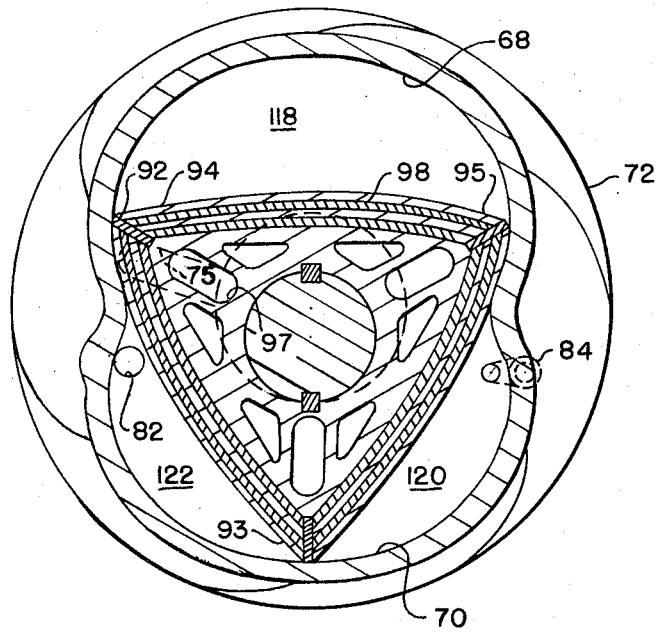
FIGURE 2 is a transverse section view of the rotary internal combustion engine structure illustrated in FIGURE 1 taken substantially on the line 2—2 in FIGURE 1.

As shown best in FIGURE 2, the outer and inner rotors 14 and 16 are rotated about axes which are in transverse spaced apart relation and are of predetermined shape to provide exact sealed chambers therebetween on rotation thereof at an exact speed ratio which speed ratio is maintained by the rotor speed ratio gear structure 18.

More specifically the housing 12 includes the cylindrical member 26 open at both ends and end plates 28 and 30 which may be secured to the cylindrical member 26 at the opposite ends thereof by convenient means, such as bolts 32. The cover 34 is also provided to close the end plate 30 and is secured thereto by convenient means, such as bolts 36.

End plate 28 is annular and is shaped in section, as illustrated best in FIGURE 1. Thus, the end plate 28 is provided with the stepped annular internal recesses 38 and 40 therein in which the bearings 42 and 44 are positioned. End plate 28 is also provided with a fuel intake passage 46 which forms a portion of the fuel intake structure 20 and an opening 48 through which a portion of the ignition structure 24 extends. Openings 49 through which cooling air may be drawn and which provide access to spark plug 84 are also provided through end plate 28 spaced angularly therearound.

End plate 30 is similarly annular and is provided with an annular internal recess 50 in which the bearing 52 is secured. The annular recess 54 and the end plate 30 provide a housing for the rotor speed ratio gear structure 18, as shown best in FIGURE 1. The opening 56 in end plate 30 provides an outlet for the exhaust structure 22. Openings 57 like openings 49 are provided through end plate 30 through which cooling air is passed.

Cover 34 for end plate 30 is also annular and includes the internal recess 58 in which the bearing 60 is secured. Cover 34 completes the housing for the speed ratio gears 18.

The outer rotor 14 is formed of two separate rotor members 62 and 64 shaped in longitudinal cross section, as shown best in FIGURE 1, and connected together by convenient means, such as bolts 66. The outer rotor is shaped in transverse cross section, as shown best in FIGURE 2, to provide two outer rotor cavities 68 and 70. Cooling fins 72 are provided on the outer surface of the outer rotor 68 and serve to draw cooling air axially of the housing 12 through openings 49 and 57 in the end plates 28 and 30.

The outer rotor 68 is rotatably mounted in bearings 42 and 52 at the opposite ends 74 and 76 thereof, respectively. The smaller speed ratio gear 78 is secured to the end 76 of the outer rotor 14 by convenient means, such as key 80 for rotation therewith.

Outer rotor 14, as shown best in FIGURE 1, is in axial communication with the fuel intake passage 46 of the fuel intake structure 20 and forms a part of the fuel intake structure 20, and in addition is provided with a fuel intake recess 75 and an exhaust passage 82 of exhaust structure 22 extending therethrough. The exhaust passage 82 and fuel intake recess 75 are shown angularly displaced in FIGURE 1 for clarity. The exact angular positions thereof are show in FIGURE 2.

A spark plug 84 of the ignition structure 24 is additionally carried by the outer rotor 14. Spark plug 84 provides an ignition spark within the chamber formed with cavity 70 of the outer rotor 14 and the inner rotor 16 at predetermined times.

The inner rotor 16 includes the motor shaft 86 mounted for rotation in the bearings 44 and 60 about an axis transversely displaced from the axis of rotation of the outer rotor 14 and the rotor member 88 shaped in transverse cross section, as illustrated best in FIGURE 2, and secured by convenient means, such as key 90 to the motor shaft 86 for rotation therewith.

The inner rotor 16 has the radially extending sealing members 92 secured in the radially outer portions of the lobes 93, 94 and 95 thereof, as shown best in FIGURE 2. The sealing members 92 are urged radially outwardly of the inner rotor 16 by means of the leaf springs 96 positioned in the rotor radially inwardly of the sealing member 92. Similar sealing members 98 which are urged axially of the inner motor 16 by springs 100 are provided for sealing between the outer and inner rotors 14 and 16 and are carried by the inner rotor 16.

A plurality of axially extending passages 97 are provided extending through the rotor 16 in successive communication with both the fuel intake recess 75 and the fuel intake passage 46 in end plate 28 during relative rotation of rotors 14 and 16. Thus, during fuel intake, fuel is drawn from conduit 102, through passage 48, through chamber 99 between the motor shaft 86 and rotor 14, through passage 97 and recess 75 into the chamber formed between rotor 16 and cavity 68 of rotor 14.

A speed ratio ring gear 101 is secured to the motor shaft 86 for rotation therewith by convenient means, such as the key 103. The ring gear 101 is meshed with the gear 78 secured to the outer rotor 14 and rotates in mesh therewith about an axis in transverse spaced relation thereto, as shown best in FIGURE 3.

The fuel intake structure 20 includes the intake conduit 102 which may be connected to the usual air fuel mixture supply means for internal combustion engines and which is connected to the end plate 28 by convenient means, such as bolts (not shown), the passage 46 through the end plate 28, chamber 99 formed between the motor shaft 86 and the member 62 of the outer rotor 14, passages 97 in rotor 16 and recess 75 in rotor 14.

The ignition structure 24 includes the cam 104 extending through bearing 106 secured in the end plate 28 and spark plug 84 secured in the outer rotor member 14. In operation, the cam 104 may be connected to an internal combustion engine ignition circuit, which ignition circuits are well known in the internal combustion engine art, to provide an electrical contact between the spark plug 84 and the cam 104 for a predetermined time during the rotation of the outer rotor 14.

The timing of application of electric energy to the spark plug 84 through cam 104 can be synchronized by any convenient timing mechanism, many of which are well known, such as a gear train operating between the motor shaft 86 and the shaft 108 on which the cam 104 is mounted.

The exhaust structure 22 includes the opening 82 positioned in the member 64 of the outer rotor 14 and the annular exhaust manifold 110 which is secured to the end plate 30 by convenient connecting structure, such as abutments 112, and which is sealed with respect to the member 64 of the outer rotor 14 by convenient means, such as the sealing grooves and tongues 114 and 116. The manifold 110 extends out of housing 12 through opening 56.

In over-all operation of the rotary internal combustion engine 10, the motor shaft 86 is cranked counterclockwise by, for example, the usual internal combustion engine starter mechanism. The outer and inner rotors 14 and 16 will rotate simultaneously about their transversely spaced apart axes of rotation at different speeds due to the speed ratio gears 18 to which they are connected. In the internal combustion engine structure 10 having outer and inner rotors 14 and 16 the speed ratio gears 78 and 101 are of a size to rotate the outer rotor 14 faster than the inner rotor 16. The speed ratio between the rotors 14 and 16 is two to three in the engine 10; that is to say, the outer rotor motor makes three complete revolutions while the inner rotor motor makes two complete revolutions. Thus, with the structure of the engine 10, with the cavities 68 and 70 formed as shown and with the inner rotor 16 formed as shown having lobes 93, 94 and 95 thereon, the radially outermost portion of the lobes, that is the radially outer portions of the seals 92, will trace exactly the configuration of the lobes 68 and 70.

On turning the motor shaft 86 so that lobe 95 of inner rotor 16 passes the intake recess 75 in the outer rotor 14, the chamber into which the intake recess 75 opens formed between the lobe 95 of the inner rotor 16 and the left hand portion of the cavity 68 of the outer rotor 14 becomes progressively larger until a maximum volume is attained therefor with the rotors 14 and 16 positioned substantially as shown in FIGURE 2.

During the increase in size of the chamber formed between the cavity 68 and the inner rotor 16, fuel air mixture is positively drawn through the passage 97 and recess 75 due to the vacuum creates in the chamber between the cavity 68 and rotor 16. The fuel is heated and cools the rotors as it passes between the rotor 14 and shaft 86 and through rotor 16.

Subsequent relative rotation of the outer rotor 14 and inner rotor 16 will cause the inner rotor 16 to move generally in a clockwise direction relative to the outer rotor 14 so that the fuel mixture is compressed a maximum amount when the seal in lobe 93 of rotor 14 is positioned at the left in FIGURE 2 exactly between the two cavities 68 and 70. The ignition structure 24 produces a spark at spark plug 84 immediately following this time so that the compressed fuel mixture is ignited and expands to drive the rotors 14 and 16 in a counterclockwise direction at the relative speed ratio determined by rotor speed ratio gear structure 18.

The ignited fuel mixture expands driving the rotors 14 and 16 until the lobe 95 of inner rotor 16 passes over the exhaust opening 82. The combustion gases are then exhausted through opening 82. The cycle of operation of the rotary engine 10 is thus complete and another cycle is immediately initiated.

In addition, it will be understood that the above indicated operation concerns a single chamber formed between the outer rotor 14 and the inner rotor 16. With the structure of internal combustion engine 10 three such chambers 118, 120 and 122 are formed between the outer and inner rotors. With such structure one chamber, such as chamber 118, is always in the fuel intake and compression portion of the cycle. Another chamber, such as chamber 120, is always in the firing portion of the cycle, while the third chamber 122 is always in the exhaust portion of the cycle. In other words, with the rotary engine structure 10 three separate cycles of operation are in different stages simultaneously to provide maximum engine efficiency.

Further, it will be seen from inspection that all of the rotating members of the engine structure 10 are balanced about the axis of rotation thereof so that little noise or vibration is produced thereby and engine wear is reduced to a minimum.

The rotary structure of engine 10 associated with varied porting would function as a pump, compressor or blower. Thus, the modification 124 of the internal combustion engine structure 10, illustrated in FIGURE 4, operates as a pump and differs from the internal combustion engine 10 primarily in that the speed ratio gears 126 and 128 are secured to the outer rotor 130 and inner rotor 132 respectively. Also, the intake and output ports 144 and 146 are substituted for the fuel intake, ignition and exhaust structures of engine 10.

The inner rotor 132 is keyed to the motor shaft 134 by key 136. Motor shaft 134 is rotatably mounted in the bearings 138 and 140 in housing 142. With such structure liquid taken in the intake port 144 is forced through outlet port 146. A pair of intake and outlet ports 144 and 146 positioned the same as port 82 at each side of each cavity in rotor 130 will provide porting for pump structure 124.

Figure 3:
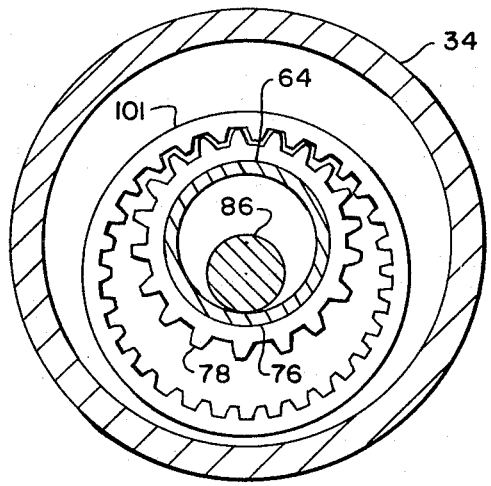
FIGURE 3 is another transverse section view of the rotary internal combustion engine structure illustrated in FIGURE 1 taken substantially on the line 3—3 in FIGURE 1.

The internal combustion engine structure 152 illustrated in FIGURE 5 is similar to the internal combustion engine structure shown in FIGURES 1–3 and pump 124 shown in FIGURE 4 in transverse cross section and differs from engine 10 primarily in that the member 154 of housing 156 forms one wall of the chamber formed between the outer rotor 158 and the inner rotor 160.

Again the outer rotor 158 is rotatably mounted in bearings 162 and 164 in the housing member 166. The inner rotor 160 is rotatably mounted on bearing 168 on shaft 170 rigidly secured to housing member 154. The small speed ratio gear 172 is secured to the inner rotor 160, while the speed ratio ring gear 174 is provided on the outer rotor 158. With the motor structure 152 the location of the fuel intake passage 176, fuel exhaust passage 178 and the ignition structure including the spark plug can be in the cover member 154 and positioned angularly where desired, as shown in FIGURE 2 for example.

Other porting can of course be applied to operate the rotary structure of engine 152 as a pump, compressor, blower or the like. Again in the engine structure 152 openings 179 and 181 are provided spaced angularly about the housing member 166 and together with fins 183 which draw air over rotor 158 provide air cooling for engine structure 152.

Figure 6:
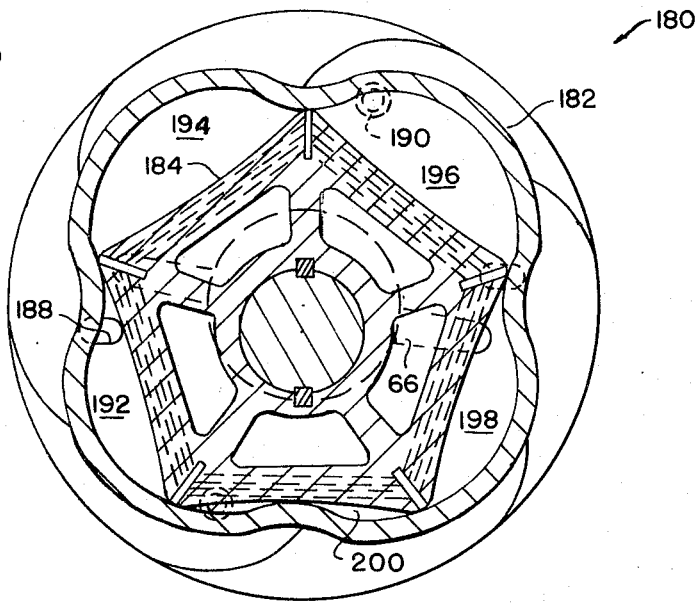
FIGURE 6 is a transverse section view of still another modification of the rotary engine structure illustrated in FIGURE 1.

The modified engine structure 180 illustrated in FIGURE 6 is exactly like the engine structure 10 illustrated in FIGURES 1–3 with the exception that the cross sectional shape of the outer rotor 182 and the inner rotor 184 has been changed and the number of intake passages 186, exhaust passages 188 and ignition structures 190 are doubled.

Thus, in operation of the modified engine structure 180 having the rotor cross sections illustrated in FIGURE 6 and driven at a speed ratio by speed ratio gears driving the inner rotor 180 four rotations to five rotations of the outer rotor 182, two complete engine cycles as considered in conjunction with the internal combustion engine structure 10 will be completed during each complete rotation of each of the five chambers 192, 194, 196, 198 and 200 formed between the rotors 182 and 184.

Figure 7A:
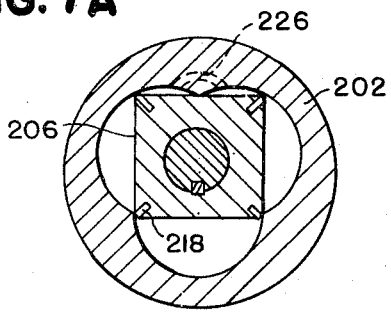
FIGURES 7A through 7D illustrate four basic possibilities of motor construction using the same rotor speed ratio.

Other rotor configurations are possible with different speed ratio gear structure. Thus, in FIGURES 7A through 7D the speed ratio gears were of a size to drive one rotor three complete cycles, while the other rotor is driven four complete cycles. In FIGURES 7A and 7C the outer rotors 202 and 204 are driven faster than the inner rotors 206 and 208, while in FIGURES 7B and 7D the inner rotors 210 and 212 were driven faster than the outer rotors 214 and 216.

Figure 7B:
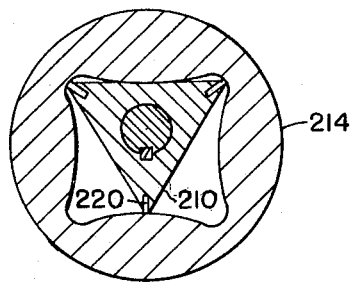
Figure 7C:
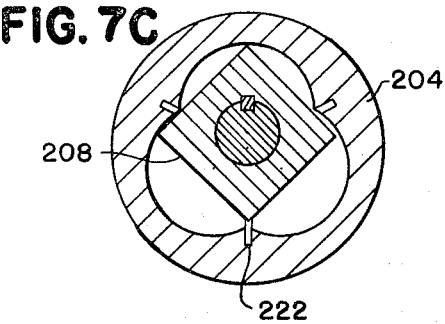

In addition, as will be particularly noted in FIGURES 7A and 7B, if the radially outermost points on the inner rotor lobes are used to determine the configuration and number of cavities in the outer rotors 202 and 214, the radially outermost points of all the lobes of rotors 206 and 210 will always define and be in contact with the inner surface of the outer rotors 202 and 214. Thus, the sealing members 218 and 220 which distinguish the individual cavities between the inner and outer rotors may be positioned at the outermost points in the lobes of the inner rotors as shown.

Figure 7D:
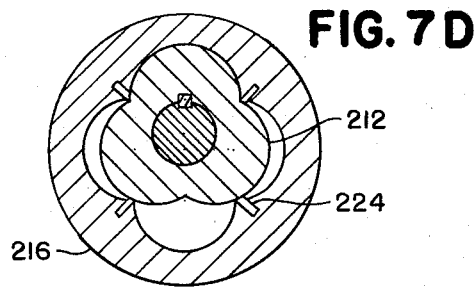

If, however, the radially innermost points of the outer rotors, such as the rotors 204 and 216 of FIGURES 7C and 7D are used to define the configuration of the inner rotors 208 and 212, then the sealing membes 222 and 224 are positioned in the outer rotor at the radially innermost points thereof to define the chambers between the outer and inner rotors. Four such rotor and sealing configurations may be provided for each set of speed ratio gears used.

Also, it will be noted that when the outer rotor is driven faster than the inner rotor that the radially innermost points of the outer rotor define the inner rotor along with the outermost points on the inner rotor lobes defining the outer rotor so that as to such rotary structures slots may be provided both at the radially innermost points of the outer rotors and at the radially outermost points of the inner rotors where it is desired to provide a greater number of sealed chambers with any predetermined set of speed ratio gears. Bypass passages between any of the chambers formed between any of the rotors, such as bypass passage 226 illustrated in FIGURE 7A may be provided as desired to assist in porting the rotary structures for engine, pump, compressor, blower or similar use in accordance with the usual porting and valving of such structures, examples of which are illustrated in FIGURES 1, 2, 4, 5 and 6.

The rotary structures illustrated in FIGURES 8A and 8B have been formed by speed ratio gear structure having a drive ratio of one to two. The inner rotor 230 is driven slower in the construction of FIGURE 8A while the outer rotor 234 is driven slower in the rotor structure illustrated in FIGURE 8B.

It will be readily appreciated that these particular rotor configurations including the outer rotor 228, inner rotor 230 and sealing means 232 in the structure of FIGURE 8A and the outer rotor 234 and inner rotor 236, together with seals 238 and porting structure, such as a pair of oppositely disposed check valves or the like at the top and bottom of the outer rotor 228 in the configuration of FIGURE 8A and at the right and left ends of the outer rotor in FIGURE 8B will produce extremely desirable pump structures having particularly large displacement.

The rotor forms illustrated in FIGURES 1 through 8 may be arrived at for each different rotor gear ratio structure by mounting two relatively rotatable members for rotation about transversely displaced parallel axes and rotating them at different speeds in accordance with the rotor gear ratio structure. A point on one member will then define the critical outline of one rotor on the other member. The radially extreme point of the critical outline on the other member, which will be an inner point if the outline defines an outer rotor and an outer point if the outline defines an inner rotor, will then define the critical outline of the other rotor on the one member.

While one embodiment of the present invention and a number of modifications thereof have been disclosed in detail, it will be understood that other embodiments and modifications of the invention are contemplated. It is the intention to include all embodiments and modifications of the invention as are defined by the appended claims within the scope of the invention.

What I claim as my invention is:

1. Rotary internal combustion engine structure comprising a stationary outer housing, a motor shaft, bearing means mounting the motor shaft for rotation in the stationary outer housing, an inner rotor mounted on said motor shaft centrally thereof for rotation therewith having a plurality of lobes, fuel intake and exhaust passages passing axially through the inner rotor radially outwardly of and extending parallel to the motor shaft, an outer rotor having a plurality of internal cavities therein receiving the inner rotor and including axially extending hollow cylindrical end portions of greater diameter than the diameter of the motor shaft, bearing means for rotatably securing the end of the outer rotor in the stationary housing for rotation about the motor shaft and relative thereto with the axis of rotation of the outer rotor displaced from the axis of rotation of the motor shaft transversely thereof approximately half the difference in the diameter of the cylindrical end portions of the outer rotor and the drive shaft at the bearing means mounting the outer rotor, a ring gear, means for securing the ring gear to the motor shaft for rotation therewith, a planet gear, means securing the planet gear to one end of the outer rotor for rotation therewith in mesh with the ring gear at one side thereof whereby on rotation of the motor shaft the ring gear is rotated to rotate the planet gear and the rotors are consequently rotated in a fixed relation to each other and the lobes on the inner rotor and the cavities in the outer rotor form a plurality of combustion chambers between the inner and outer rotors, an exhaust passage extending axially outwardly through the outer rotor, an annular exhaust manifold slidably positioned against the outer rotor so as to always be in communication with the exhaust passage therethrough on rotation of the outer rotor and extending outwardly through the stationary housing, a fuel input conduit connected to the stationary housing, a passage extending through the stationary housing from the fuel input conduit to the space between the other end of the outer rotor and the motor shaft, said fuel passage through the inner rotor aligning with the space between the ends of the outer rotor and the motor shaft on relative rotation of the inner and outer rotors and an axially extending radial recess on the interior of the outer rotor for connecting the space between the outer rotor and motor shaft with the chambers formed between the inner and outer rotors on relative rotation thereof whereby fuel is passed through the inner rotor into the chambers to cool the inner rotor and heat the fuel, axially extending passages though the ends of the stationary housing and fins on the exterior of the outer rotor for forcing air between the outer rotor and stationary housing to cool the outer rotor, sparking means secured to and carried by the outer rotor for providing a spark in the chambers to ignite fuel compressed therein, and means carried by the stationary housing for providing sparking energy to the sparking means at predetermined locations.

2. Structure as set forth in claim 1 wherein there is one more of the lobes than there is of the cavities and the ring gear and planet gear have teeth the number of which are related in the same ratio as the number of lobes and cavities.

3. Internal combustion engine structure comprising a fixed housing member having an open side, an outer rotor having cavities therein, means for mounting the outer rotor in the housing member for rotation about a first axis, an inner rotor positioned within the outer rotor having lobes thereon forming chambers in conjunction with the cavities in the outer rotor, a cover plate for the open side of the housing member including intake, exhaust and ignition ports extending therethrough in communication with said chambers for periodic fuel intake and ignition and combustion gas exhaust in timed relation to the rotation of the rotors, a shaft carried by the cover plate for mounting the inner rotor for rotation within the outer rotor and housing about a second axis parallel to and transversely spaced from the first axis and synchronizing means associated with the rotors operable to provide exact predetermined relative rotation between the inner and outer rotors.

4. Structure as set forth in claim 3 wherein the synchronizing means comprises a ring gear secured to the one rotor rotatable about the one axis and a planet gear secured to the other rotor and rotatable about the other axis in mesh with the ring gear.

5. Structure as set forth in claim 3 wherein the synchronizing means is constructed and arranged to rotate one rotor faster than the other and the number of cavities in the outer rotor and lobes on the inner rotor differ by one.

6. Structure as set forth in claim 4 wherein the ring gear and planet gear have a gear ratio which is the same as the ratio between the number of cavities and lobes of the rotors.

7. Structure as set forth in claim 3 wherein the outer rotor is provided with cooling fins and openings are provided in the fixed housing member for providing air cooling of the engine.

References Cited by the Examiner
UNITED STATES PATENTS

| | | | |
|---|---|---|---|
| 725,615 | 4/1903 | Cooley | 123—8 |
| 2,189,976 | 2/1940 | De Lavaud | 123—12 |
| 2,947,290 | 8/1960 | Froede | 123—12 |
| 2,988,065 | 6/1961 | Wankel et al. | 123—12 |
| 3,012,550 | 12/1961 | Paschke | 123—8 |
| 3,034,484 | 5/1962 | Stefancin | 123—12 |
| 3,064,880 | 11/1962 | Wankel et al. | 103—126 |
| 3,139,835 | 7/1964 | Wilkinson | 103—126 |

WILBUR J. GOODLIN, *Examiner.*

DONLEY J. STOCKING, *Primary Examiner.*